United States Patent
Johnson et al.

(10) Patent No.: US 12,523,396 B2
(45) Date of Patent: Jan. 13, 2026

(54) CLOSED WELL LOOP FOR GEOTHERMAL SYSTEMS

(71) Applicant: Schlumberger Technology Corporation, Sugar Land, TX (US)

(72) Inventors: Ashley Bernard Johnson, Cambridge (GB); Ross Lowdon, Bucharest (RO)

(73) Assignee: Schlumberger Technology Corporation, Sugar Land, TX (US)

( * ) Notice: Subject to any disclaimer, the term of this patent is extended or adjusted under 35 U.S.C. 154(b) by 77 days.

(21) Appl. No.: 18/604,572

(22) Filed: Mar. 14, 2024

(65) Prior Publication Data

US 2024/0310080 A1 Sep. 19, 2024

Related U.S. Application Data (60) Provisional application No. 63/490,047, filed on Mar. 14, 2023.

(51) Int. Cl.
*F24T 10/17* (2018.01)
*F24T 10/15* (2018.01)

(52) U.S. Cl.
CPC .............. *F24T 10/17* (2018.05); *F24T 10/15* (2018.05)

(58) Field of Classification Search
CPC . F24T 10/15; F24T 10/17; F24T 10/20; Y02E 10/10
USPC .......................................................... 165/45
See application file for complete search history.

(56) References Cited

U.S. PATENT DOCUMENTS

| | | | | |
|---|---|---|---|---|
| 3,470,943 A | * | 10/1969 | Van Huisen | F03G 4/074 202/180 |
| 3,991,817 A | * | 11/1976 | Clay | F24T 10/10 165/45 |
| 4,010,801 A | * | 3/1977 | Terry | E21B 43/243 165/45 |
| 4,223,729 A | * | 9/1980 | Foster | E21B 43/17 166/250.1 |
| 11,708,818 B1 | * | 7/2023 | Cook | F03G 4/035 60/641.2 |
| 2015/0159917 A1 | | 6/2015 | Parrella et al. | |
| 2017/0211849 A1 | | 7/2017 | Muir et al. | |
| 2020/0011151 A1 | * | 1/2020 | Toews | C09K 8/40 |

(Continued)

FOREIGN PATENT DOCUMENTS

| | | | | |
|---|---|---|---|---|
| DE | 19919555 C1 | * | 6/2000 | ............ E21B 7/06 |
| KR | 20130059828 A | * | 6/2013 | ............ F25B 13/00 |

(Continued)

OTHER PUBLICATIONS

English translation of DE 19919555C1 (Year: 1991).*

(Continued)

*Primary Examiner* — Tho V Duong
(74) *Attorney, Agent, or Firm* — Jeffrey D. Frantz (57) ABSTRACT

A closed well loop is provided for a geothermal system. The closed well loop includes at least one well having at least one lateral section the traverses a subterranean formation. Fluid flow in the at least one lateral section extracts thermal energy from the subterranean formation. The fluid flow in the at least one lateral section is driven by convection where hotter fluid convects upward along the top part of the lateral section and colder fluid convects downward along the bottom part of the lateral section.

6 Claims, 5 Drawing Sheets

(56) References Cited

U.S. PATENT DOCUMENTS

2023/0062942 A1  3/2023  Marsh et al.

FOREIGN PATENT DOCUMENTS

WO  2020034024 A1  2/2020
WO  2022018674 A1  1/2022

OTHER PUBLICATIONS

English translation of KR 20130059828A (Year: 2013).*
Hinch, E.J., "Sedimentation of Small Particles", 1988, pp. 153-161, Guyon et al. (eds) Disorder and Mixing, Kluwer Academic Publishers.

* cited by examiner

FIG. 5

CLOSED WELL LOOP FOR GEOTHERMAL SYSTEMS

CROSS-REFERENCE TOP RELATED APPLICATION(S)

The present disclosure is the National Stage Entry of International Application No. PCT/US2024/019822, filed on Mar. 14, 2024, which claims priority from U.S. Provisional Application No. 63/490,047, filed on Mar. 14, 2023, entitled "CLOSED WELL LOOP FOR GEOTHERMAL SYSTEMS", herein incorporated by reference in its entirety.

FIELD

The present disclosure relates to geothermal systems having a closed well loop that extracts thermal energy (heat) from a subterranean formation.

BACKGROUND

Figure 1:
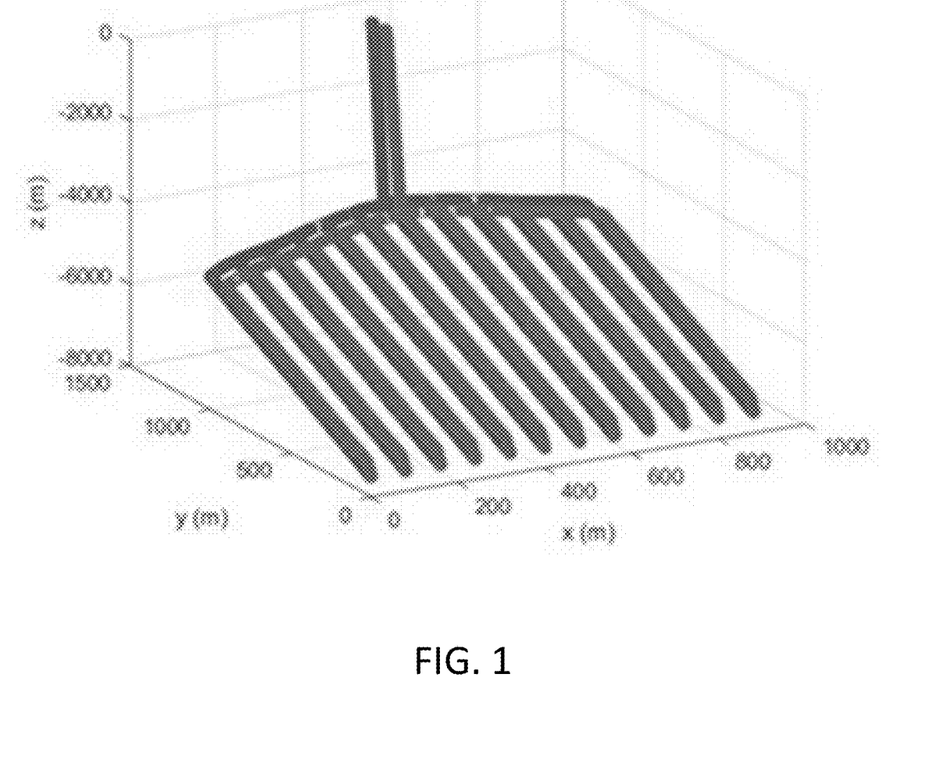
FIG. 1 is schematic diagram of a prior art closed well loop having an injection well and a production well drilled from the same well pad with multilateral loops that extend parallel relative to one another and are sloped downwards.

Geothermal systems that employ a closed well loop are generating considerable interest. Typically, these systems include an injection well and a production well that are connected by many multilateral loops. These multilateral loops are drilled from the parent injection and production wells and intersect at a far length. In most well plans, the multilateral loops extend parallel relative to one another and are sloped downwards. FIG. 1 shows a closed well loop having an injection well and a production well drilled from the same well pad with multilateral loops that extend parallel relative to one another and are sloped downwards. This is currently the preferred geometry for large scale geothermal systems. Typically, the closed well loop of the geothermal system is modeled with detailed formation models to capture the heat transfer outside of the well. Within the well, a 1D model is used which neglects the convection within the well. Unfortunately, this design neglects the impact of convection and will not balance the flows between the multilateral loops.

SUMMARY

A closed well loop is provided for a geothermal system. The closed well loop includes at least one well having at least one lateral section that traverses a subterranean formation. Fluid flow in the at least one lateral section extracts thermal energy from the subterranean formation. The fluid flow in the at least one lateral section is driven by convection where hotter fluid convects upward along the top part of the lateral section and colder fluid convects downward along the bottom part of the lateral section.

In embodiments, the at least one well can include an injection well and a production well. The injection well can include at least one lateral section that traverses the subterranean formation. Fluid flow in the at least one lateral section of the injection well extracts thermal energy from the subterranean formation. The fluid flow in the at least one lateral section of the injection well is driven by convection where hotter fluid convects upward along the top part/side of the lateral section of the injection well and colder fluid convects downward along the bottom part/side of the lateral section of the injection well. The production well can include at least one lateral section that traverses the subterranean formation. Fluid flow in the at least one lateral section of the production well extracts thermal energy from the subterranean formation. The fluid flow in the at least one lateral section of the production well is driven by convection where hotter fluid convects upward along the top part/side of the lateral section of the production well and colder fluid convects downward along the bottom part/side of the lateral section of the production well.

In embodiments, the injection well can have a build/curve section at lowest depth of both the injection well and the production well. The at least one lateral section of the injection well can be configured to extend from the build/curve section of the injection well generally upward toward a corresponding lateral section of the production well.

In embodiments, the production well can have a build/curve section at a depth above the build/curve section of the injection well. The at least one lateral section of the production well can be configured to extend from the build/curve section of the production well generally downwards toward a corresponding at least one lateral section of the injection well.

In embodiments, the at least one lateral section of the injection well can be configured to intersect a corresponding lateral section of the production well at or near a toe section of the production well.

In embodiments, the at least one well can be a single well having a vertical section with an injection manifold that extends through the vertical section. The at least one lateral section can be configured to extend from the vertical section at a position offset from the bottom of the injection manifold.

In embodiments, the at least one well can be a single well having a vertical section with an injection manifold that extends through the vertical section to an isolated bottom region. The at least one lateral section can be at least one lateral production section that extends from the vertical section at a position offset from the isolated bottom section. At least one lateral injection section can be configured to extend from the isolated bottom region to a toe segment of a corresponding lateral production section. In embodiments, the at least one lateral injection section can be drilled with a diameter less than the diameter of the least one lateral production section.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Embodiments of the present disclosure relate to geothermal systems that circulate working fluid in a closed well loop that traverses a subterranean formation to extract thermal energy (heat) from the subterranean formation.

Figure 2:
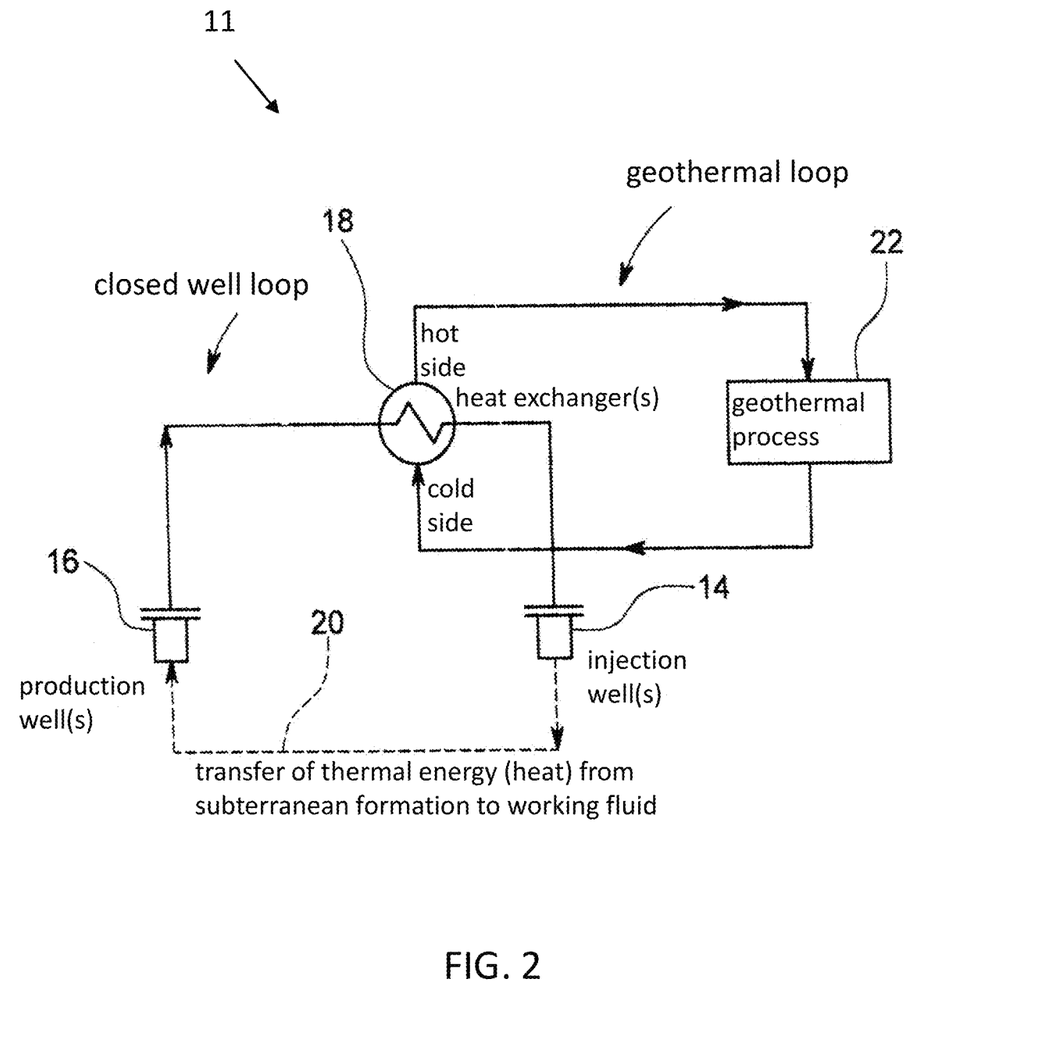
FIG. 2 is a schematic diagram of a geothermal system that includes a closed well loop operably coupled to a geothermal loop by one or more heat exchangers.

By way of background, FIG. 2 shows a geothermal system 11 that includes a closed well loop operably coupled to a geothermal loop by one or more heat exchangers 18. The closed well loop includes one or more injection wells 14 and one or more production wells 16 that traverse a subterranean formation. Working fluid circulates in the closed well loop down the injection well(s) 14 and up the production well(s) 16 to extract thermal energy (heat) from the subterranean formation. Part of the injection well(s) 14 and the production well(s) 16 are configured to allow thermal energy (heat) from the subterranean formation to transfer to the working fluid that circulates in the closed well loop, which creates an increase in temperature between the working fluid that flows up the production well(s) and the working fluid that flows down the injection well(s) 14. The heat exchanger(s) 18 recovers the heat transferred from the formation to the working fluid and uses this heat in the geothermal loop. The geothermal loop can include a geothermal process 22 that uses the heat for large scale heating or cooling, power generation, industrial/agricultural processes or other geothermal applications. The system can include one or more pumps (not shown) to circulate the working fluid in the closed well loop. The pump(s) can be located at the surface or possibly downhole (such as line shaft pumps or electrical submersible pumps).

According to one aspect of the disclosure, directional drilling can be used to define the trajectory of the injection well and production well of the closed well loop in order to capture the impact of convection in the closed well loop and to balance flows in the closed well loop. Specifically, directional drilling can be used to drill the injection well with a build/curve section at the lowest depth of both the injection well and the production well. The directional drilling is further configured to turn upward from the build/curve section of the injection well and then splitting off the drilling of one or more lateral sections of the injection well that extend generally upward and away from the build/curve section of the injection well. Directional drilling is also used to drill the production well with a build/curve section at a depth above the build/curve section of the injection well. The directional drilling is further configured to turn downward from the build/curve section of the production well and then splitting off the drilling of one or more lateral sections of the production well that extend generally downward and away from the build/curve section of the production well toward the corresponding lateral section(s) of the injection well.

The corresponding pair(s) of lateral sections of the injection well and production well can be drilled to intersect one another at a distance spaced from both the build/curve section of the injection well and the build/curve section of the production well. The intersection of a pair of lateral sections of the injection and production wells fluidly connect these lateral sections as part of the closed well loop. Such intersection(s) can be provided at or near the toe of the production well.

Alternatively, the corresponding pair(s) of lateral sections of the injection well and the production well can be spaced from one another and fluidly connected to one another as part of the closed well loop by perforations formed in the formation and/or porous source rock of the formation.

In embodiments, the lateral section(s) (or part thereof) of the injection well and/or the lateral section(s) (or part thereof) of the production well can be completed without a casing. Furthermore, the lateral section(s) (or part thereof) of the injection well and/or the lateral section(s) (or part thereof) of the production well can optionally employ thermally conductive material (e.g., grout) to improve the performance of closed well loop by matching the thermal conductivity of the surrounding formation and creating a non-permeable seal to prevent unwanted fluid flow into the formation.

The lateral section(s) of the injection well can be configured to extend upward and away from the build/curve section of the injection well toward corresponding lateral sections(s) of the production well. In embodiments that includes a plurality of lateral sections for the injection well, such lateral sections can extend generally parallel to one another.

The lateral section(s) of the production well can be configured to extend downward and away from the build/curve section of the production well toward corresponding lateral sections(s) of the injection well. In embodiments that included a plurality of lateral sections for the production well, such lateral sections can extend generally parallel to one another.

In embodiments, the lowest point in the closed well loop can be in a build/curve section of the injection well with the lateral section(s) of the injection well extending generally upward from the build/curve section of the injection well to intersect corresponding lateral section(s) of the production well, which extend generally downward from the build/curve section of the production well. The lateral section(s) of the injection well and/or the lateral section(s) of production well of the closed well loop can be configured to extend through a geothermal reservoir (e.g., hot rock of a subterranean formation) and extract thermal energy (heat) from the geothermal reservoir and transfer the heat to the working fluid that flows therein. In this design, convection can drive the circulation of the working fluid in the lateral section(s) of the injection well and in the lateral section(s) of the production well. Convection in the lateral section(s) of the injection well drives hotter fluid upwards towards the toe of the injection well and the corresponding lateral section of the production well and drives cooler fluid downwards toward the build/curve section of the injection well. In this configuration, the top part/side of the lateral section(s) of the injection well can be hotter than the bottom part/side of the lateral section(s) of the injection well due to such convention. This temperature difference can be attributed to the "Boycott Effect" which describes how cooler heavier fluids drop to the lower side of the conduit and then convect downwards, while hotter lighter fluids convect upwards on the top side of the conduit as described by Hinch, J., (1988), "Sedimentation of Small Particles", E. Guyon et al. (eds) Disorder and Mixing, 153-161, Kluwer Academic Publishers. Convection in the lateral section(s) of the production well drives hotter fluid upwards towards the build/curve section of the production well and the top of the production well at the surface and drives cooler fluid downwards toward the toe of the production well. In this configuration, the top part/side of the lateral section(s) of the production well can be hotter than the bottom part/side of the lateral section(s) of the production well due to such convention. This temperature difference can be attributed to the "Boycott Effect" as described herein. The convention can balance the flow of circulating fluid over a number of lateral sections of the injection well and production well such that the lateral sections of the production well produce at or near a similar rate.

In embodiments, the well geometry can be constructed such that the lateral sections of the injection well continuously rise from the build/curve section of the injection well to the intersections with the corresponding lateral sections of the production well, and the lateral sections of the production well continuously rise from such intersections to the build/curve section of the production well. The well geometry can be configured to maximize the production of hot fluids and balance the flows through the corresponding lateral sections. Thus, if a lateral section produces more heat, then the convection drive will increase and the temperature rise in that lateral section will fall reducing the convection drive.

Figure 3:
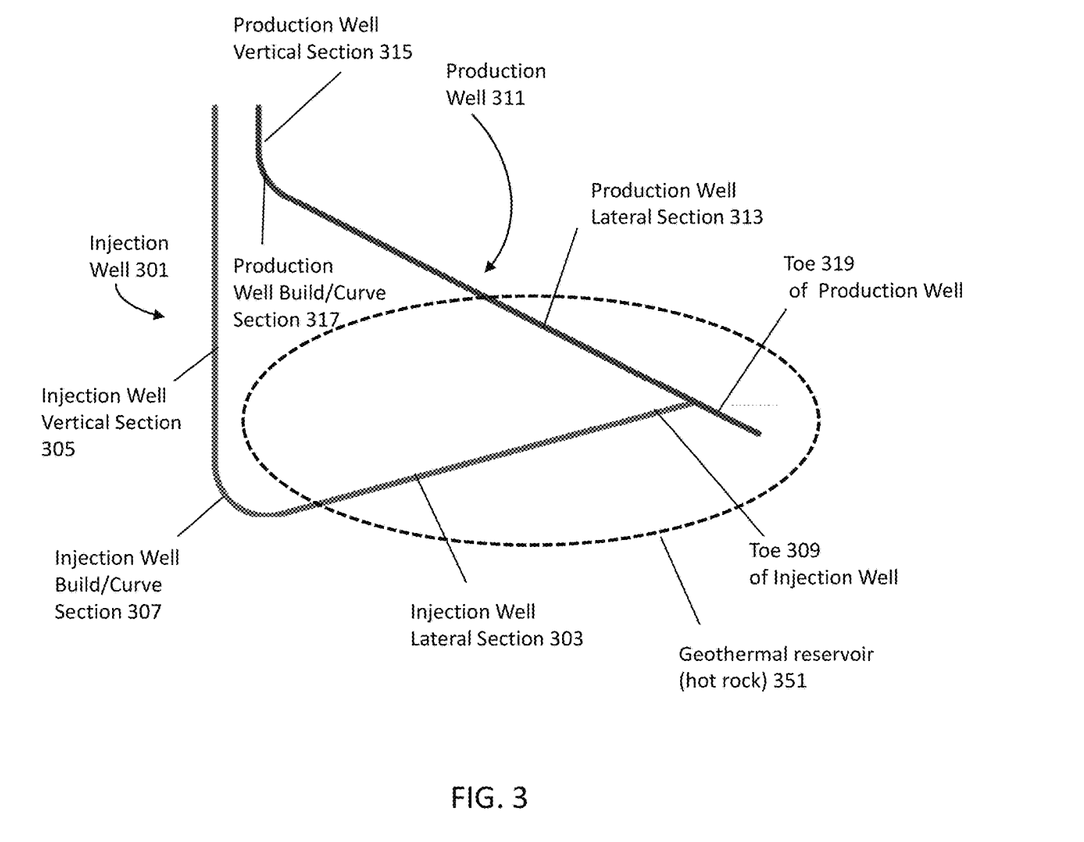
FIG. 3 is a schematic diagram of an embodiment of a closed well loop according to the present disclosure.

FIG. 3 is a schematic diagram of an embodiment of a closed well loop according to the present disclosure. The closed well loop can be part of a geothermal system (e.g., FIG. 2). The closed well loop of FIG. 3 includes an injection well 301 and a production well 311. The injection well 301 includes a single lateral section 303, and the production well 311 includes a single lateral section 313. Directional drilling can be used to drill the injection well 301 with a transition from a vertical section 305 to a build/curve section 307 at the lowest depth of both the injection well 301 and the production well 311. The directional drilling is further configured to turn upward from the build/curve section 307 of the injection well 301 and then splitting off the drilling of the lateral section 303 that extends generally upward and away from the build/curve section 307. Directional drilling is also used to drill the production well 311 with a transition from a vertical section 315 to a build/curve section 317 at a depth above the build/curve section 307 of the injection well 301 as shown. The directional drilling is further configured to turn downward from the build/curve section 317 and then splitting off the drilling of the lateral section 313 that extends generally downward and away from the build/curve section 317 toward the corresponding lateral section 303 of the injection well 301. The corresponding pair of lateral section 303 and lateral section 313 can be drilled such that the toe 309 of the injection well 301 intersects the production well 311 at a distance from the respective build/curve sections 307, 317 of the injection well and the production well at or near the toe 319 of the production well 311 as shown. The lateral sections 303, 313 of the closed well loop can be configured to extend through a geothermal reservoir (e.g., hot rock of a subterranean formation) 351 and extract thermal energy (heat) from the geothermal reservoir and transfer the heat to the working fluid that flows therein. The trajectory of the lateral section 303 can be drilled by kicking off the lateral section by drilling upwards and slightly to the right or left.

In embodiments, the lateral sections 303, 313 (or part thereof) of the closed well loop can be completed without a casing. Furthermore, the lateral sections 303, 313 (or part thereof) of the closed well loop can optionally employ thermally conductive material (e.g., grout) to improve the performance of closed well loop by matching the thermal conductivity of the surrounding formation and creating a non-permeable seal to prevent unwanted fluid flow into the formation.

Figure 4:
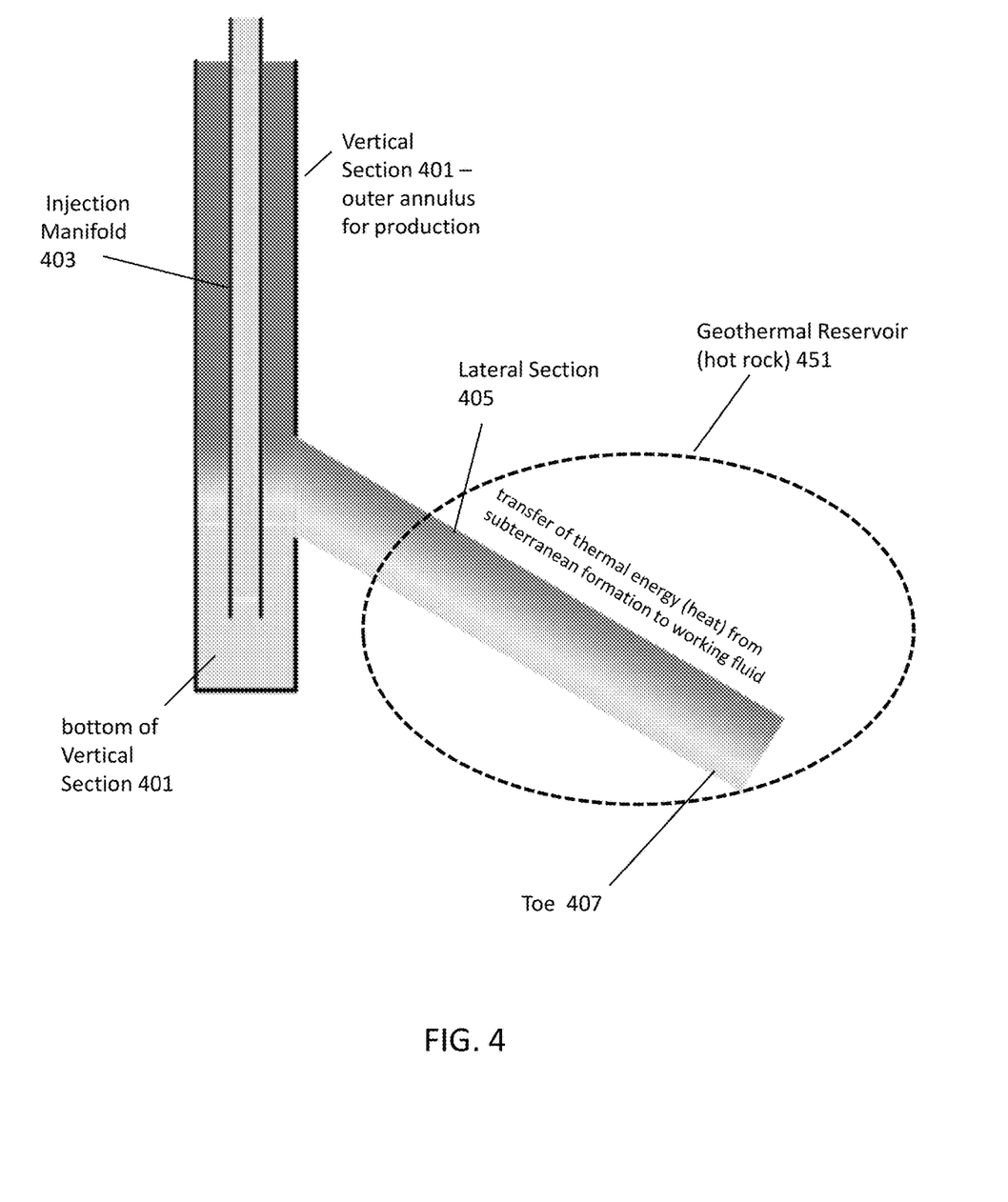
FIG. 4 is a schematic diagram of another embodiment of a closed well loop according to the present disclosure.

FIG. 4 is a schematic diagram of another embodiment of a closed well loop according to the present disclosure. The closed well loop can be part of a geothermal system (e.g., FIG. 2). The closed well loop of FIG. 4 is formed by a single well. In this embodiment, a vertical section 401 is provided with an injection manifold 403 that extends from the top of the vertical section 401 to a point at or near the bottom of the vertical section 401. A lateral section 405 extends from the vertical section 401 at a location offset vertically above the bottom of the vertical section 401 and above the bottom of the injection manifold 403. The lateral section 405 extends generally downward from the vertical section 401 to a toe 407. In embodiments, the toe 407 can be located below the bottom of the vertical section 401 as shown. The lateral section 405 can be configured to extend through a geothermal reservoir (e.g., hot rock of a subterranean formation) 451 and extract thermal energy (heat) from the geothermal reservoir and transfer the heat to the working fluid that flows therein. The working fluid is circulated in the well such that it flows down the injection manifold 403 and exits near the bottom of the vertical section 401. Convection will drive the cooler fluid to flow downward toward the toe 407. Thermal energy (heat) from the surrounding formation will transfer to the circulating fluid in the lateral section 405, and convection will drive hotter fluid upward toward the vertical section 401. In this configuration, the top part/side of the lateral section 405 can be hotter than the bottom part/side of the lateral section 405 due to such convention. This temperature difference can be attributed to the "Boycott Effect" as described herein. The working fluid flows upward in the outer annulus of the vertical section 401 for production. Because the working fluid enters at the lower side of the vertical section 401, there will be some segmentation between the warm fluid at the top of the vertical section 401 and the cold fluid at the bottom of the vertical section 401 such that the single well closed loop will produce heat. The limit of the heat produced will be due to the mixing at the interface between the hot and cold fluids.

In embodiments, the lateral section 405 (or part thereof) can be completed without a casing. Furthermore, the lateral section 405 (or part thereof) can optionally employ thermally conductive material (e.g., grout) to improve the performance of closed well loop by matching the thermal conductivity of the surrounding formation and creating a non-permeable seal to prevent unwanted fluid flow into the formation.

Figure 5:
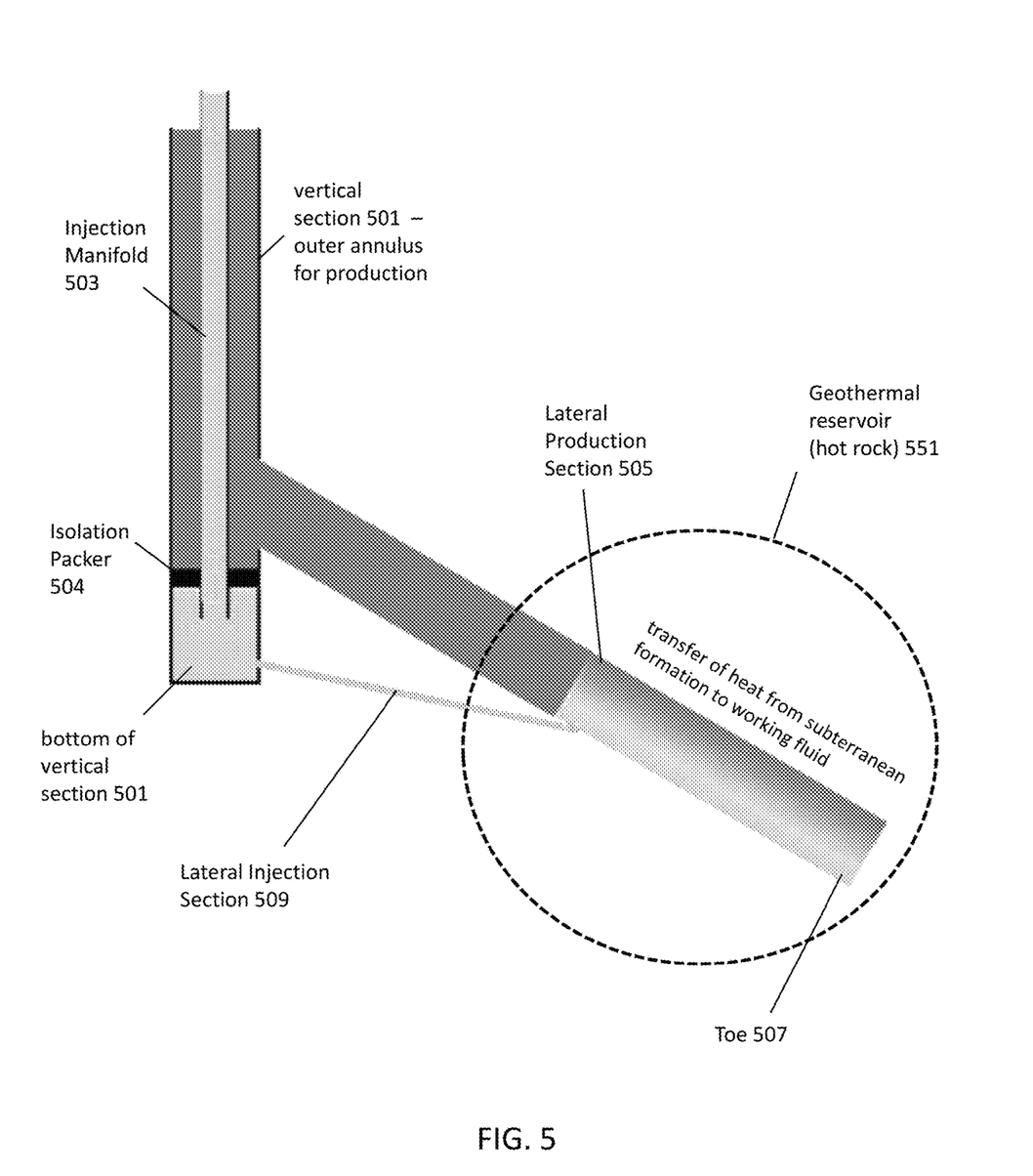
FIG. 5 is a schematic diagram of another embodiment of a closed well loop according to the present disclosure.

FIG. 5 is a schematic diagram of yet another embodiment of closed well loop according to the present disclosure. The closed well loop can be part of a geothermal system (e.g., FIG. 2). The closed well loop of FIG. 5 is formed by a single well. In this embodiment, a vertical section 501 is provided with an injection manifold 503 that extends from the top of the vertical section 501 to a point at or near the bottom of the vertical section 501. An isolation packer 504 is disposed at or near the bottom of the injection manifold 503 to isolate the bottom of the vertical section 501 from the outer annulus of vertical section 501 above the isolation packer 504. One or more lateral production sections (one shown as 505) extend from the vertical section 501 at a location offset vertically above the isolation packer 504. The lateral production section(s) 505 extend generally downward from the vertical section 501 to a respective toe 507. The lateral production section 507 can be configured to extend through a geothermal reservoir (e.g., hot rock of a subterranean formation) 551 and extract thermal energy (heat) from the geothermal reservoir and transfer the heat to the working fluid that flows therein. One or more lateral injection segments (one shown as 509) extend from the bottom of the vertical section 501 (below the isolation packer 504) to the corresponding lateral production section 505. The lateral injection section(s) 509 extends generally downward from the vertical section 501 to intersect the corresponding lateral production section 505 as shown. FIG. 5 shows only one lateral production section 505 and one lateral injection section 509 for illustrative purposes only. Embodiments can employ a plurality of lateral production sections and a corresponding plurality of lateral injection sections that extend from the vertical section of the well in a manner similar to the single lateral production section and single lateral injection section shown in FIG. 5.

The working fluid is circulated in the well such that it flows down the injection manifold 503 and exits near the bottom region of the vertical section 501 that is isolated by the packer 504. The working fluid flows from the isolated bottom region of the vertical section 501 down the lateral injection section(s) 509 to the corresponding lateral production section(s) 505. Convection will drive the cooler fluid to flow downward in the lateral production section 505 toward the toc 507. Thermal energy (heat) from the surrounding formation will transfer to the circulating fluid in the lateral production section 505, and convection will drive hotter fluid upward toward the vertical section 501 and drive cooler fluid downward in the lateral production section 505. In this configuration, for at least part of the lateral production section 505 disposed between the intersection to the corresponding lateral injection section 509 and the toe 507, the top part/side of the lateral production section 505 can be hotter than the bottom part/side of the lateral production section 505 due to such convention. This temperature difference can be attributed to the "Boycott Effect" as described herein. The working fluid flows upward in the outer annulus of the vertical section 501 for production.

In embodiments, the lateral injection section(s) 509 of the well can be drilled with coiled tubing to use tighter radius of curvature and reduced complexity. Furthermore, the lateral injection section(s) 509 of the well can be drilled with a smaller diameter relative to the lateral production section(s) 505 of the well such that forced convection dominates over free (thermal) convection in the circulating fluid that flows therein, which can further enhance the efficiency of the system.

In embodiments, the lateral production section 505 (or part thereof) can be completed without a casing. Furthermore, the lateral production section 505 (or part thereof) can optionally employ thermally conductive material (e.g., grout) to improve the performance of closed well loop by matching the thermal conductivity of the surrounding formation and creating a non-permeable seal to prevent unwanted fluid flow into the formation.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A closed well loop for a geothermal system, the closed well loop comprising:
    at least one well having at least one lateral section that traverses a geothermal reservoir in a subterranean formation, wherein fluid flow in the at least one lateral section extracts thermal energy from the geothermal reservoir, and wherein the flow of fluid in the at least one lateral section is driven by convection where hotter fluid convects upward along a top part of the lateral section and colder fluid convects downward along a bottom part of the lateral section, and wherein:
    the at least one well includes an injection well and a production well;
    the injection well includes at least one lateral section that traverses the geothermal reservoir, wherein fluid flow in the at least one lateral injection section of the injection well extracts thermal energy from the geothermal reservoir, and wherein the fluid flow in the at least one lateral section of the injection well is driven by convection where hotter fluid convects upward along the top part of the lateral section of the injection well and colder fluid convects downward along the bottom part of the lateral section of the injection well;
    the production well includes at least one lateral section that traverses the geothermal reservoir, wherein fluid flow in the at least one lateral section of the production well extracts thermal energy from the geothermal reservoir, and wherein the fluid flow in the at least one lateral section of the production well is driven by convection where hotter fluid convects upward along the top part of the lateral section of the production well and colder fluid convects downward along the bottom part of the lateral section of the production well;
    the injection well has a build/curve section at lowest depth of both the injection well and the production well;
    the at least one lateral section of the injection well extends from the build/curve section of the injection well generally upward toward a corresponding at least one lateral section of the production well;
    the production well has a build/curve section at a depth above the build/curve section of the injection well;
    the at least one lateral section of the production well extends from the build/curve section of the production well generally downwards toward a corresponding at least one lateral section of the injection well;
    the at least one lateral section of the injection well is configured to intersect the corresponding lateral section of the production well; and
    the production well continues on a downward trajectory past the intersection of the lateral section of the injection well and the corresponding lateral section of the production well.

2. The closed well loop according to claim 1, wherein:
    the production well includes a production conduit that gathers the hotter fluid that rises up the top part of the at least one lateral section of the production well.

3. The closed well loop according to claim 1, wherein:
at least part of the lateral section of the production well is completed without a casing; and
at least part of the lateral section of the production well employs thermally conductive material that matches thermal conductivity of the surrounding formation and creates a non-permeable seal to prevent unwanted fluid flow into the formation.

4. The closed well loop according to claim 1, wherein:
the at least one lateral section of the injection well is configured to intersect the corresponding lateral section of the production well at or near a toe of the production well.

5. The closed well loop according to claim 1, wherein:
at least part of the lateral section of the injection well is completed without a casing, and at least part of the lateral section of the production well is completed without a casing; and
at least part of the lateral section of the injection well employs thermally conductive material that matches thermal conductivity of the surrounding formation and creates a non-permeable seal to prevent unwanted fluid flow into the formation, and at least part of the lateral section of the production well employs thermally conductive material that matches thermal conductivity of the surrounding formation and creates a non-permeable seal to prevent unwanted fluid flow into the formation.

6. The closed well loop according to claim 1, wherein:
at least part of the lateral section of the injection well is completed without a casing; and
at least part of the lateral section of the injection well employs thermally conductive material that matches thermal conductivity of the surrounding formation and creates a non-permeable seal to prevent unwanted fluid flow into the formation.

* * * * *